May 26, 1936.                J. McCREADIE ET AL                2,042,184
                                 LUBRICATOR
                            Filed Feb. 14, 1933            2 Sheets-Sheet 2
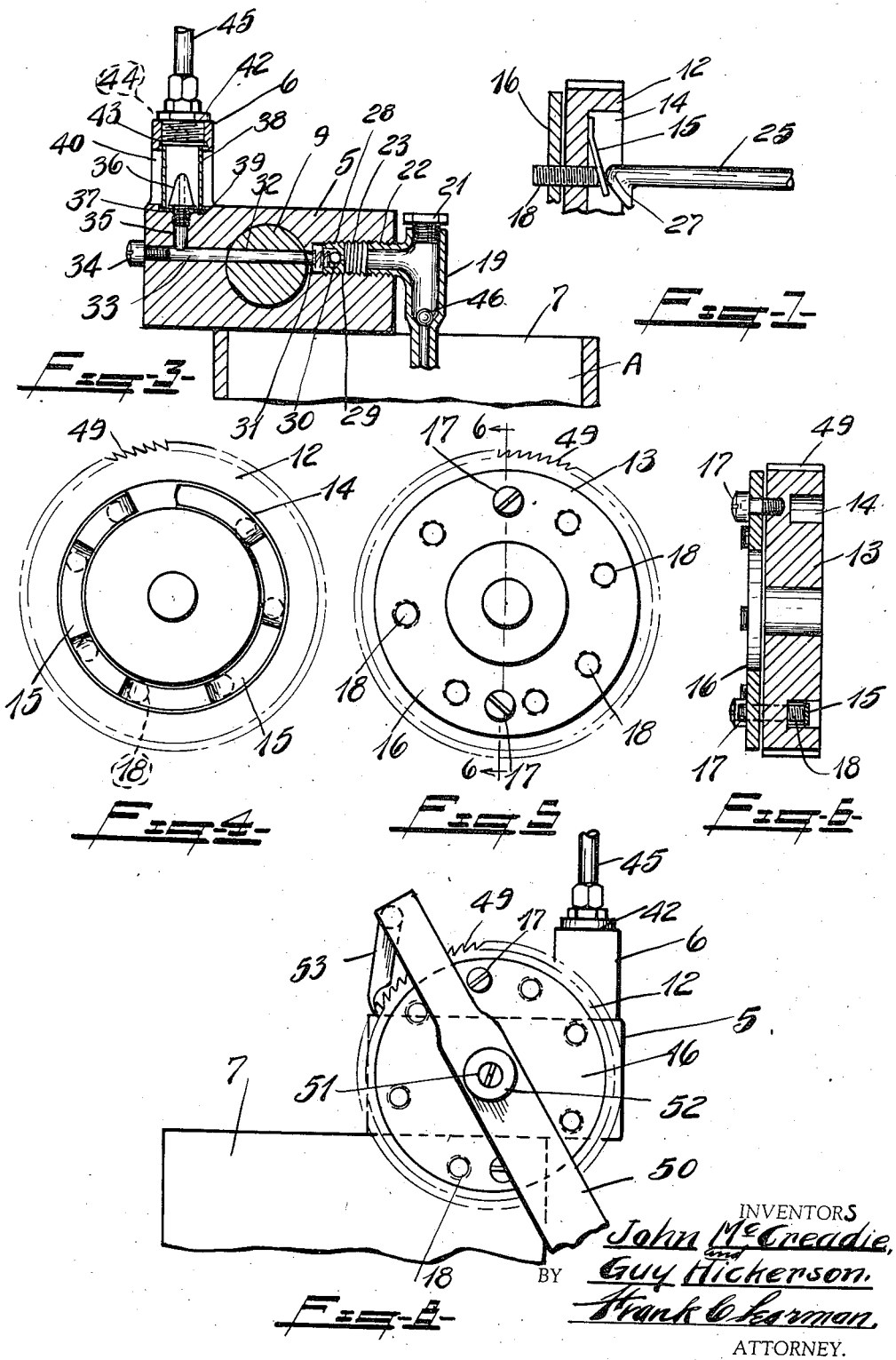
INVENTORS
John McCreadie
Guy Hickerson
Frank C. Earman
ATTORNEY.

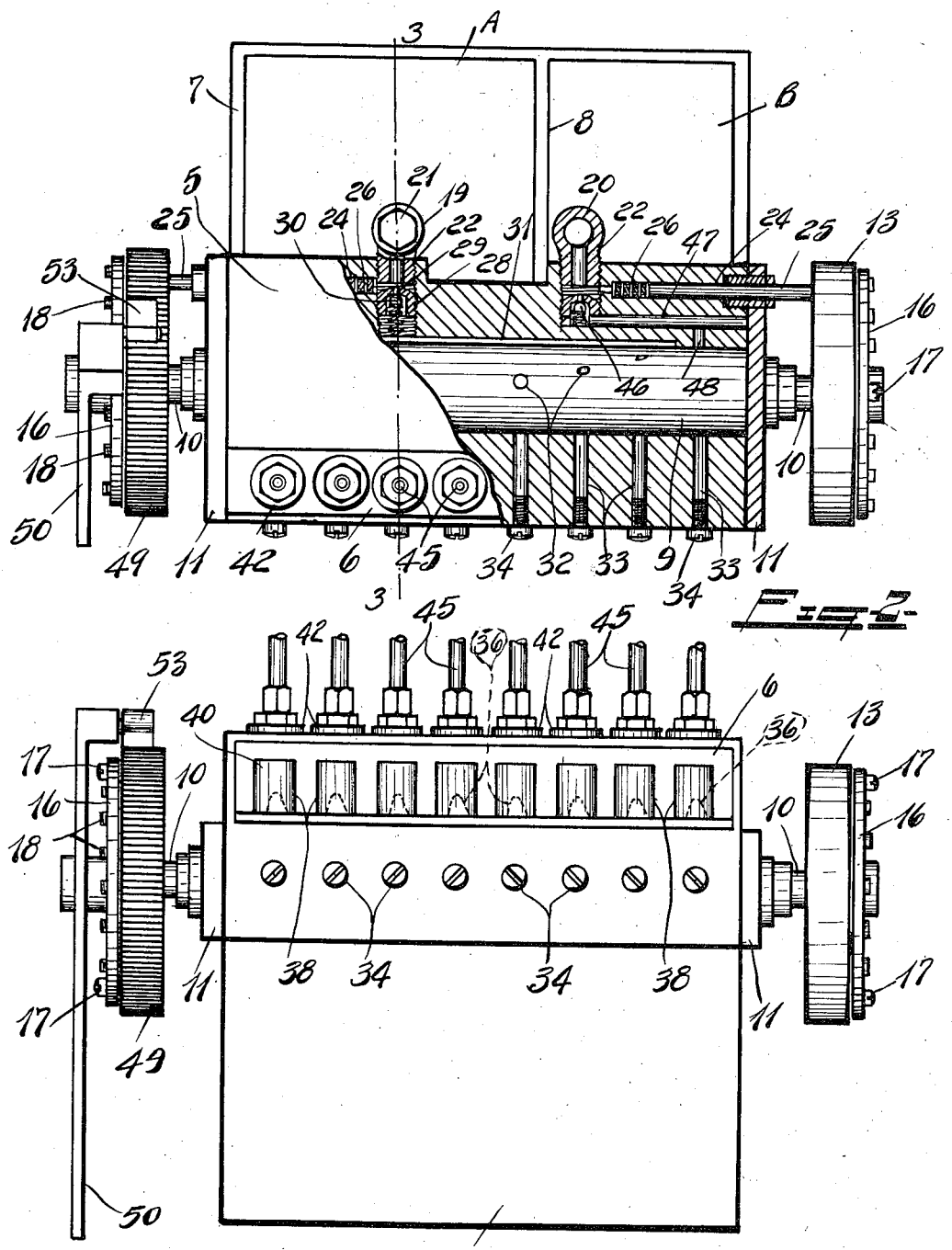

Patented May 26, 1936

2,042,184

UNITED STATES PATENT OFFICE 2,042,184

LUBRICATOR

John McCreadie and Guy Hickerson, Midland, Mich.

Application February 14, 1933, Serial No. 656,694

9 Claims. (Cl. 184—35)

This invention relates to lubricators, and more particularly to a force feed lubricator which can be adjusted so that the volume of lubricant forced to any bearing or through any conduit may be varied with relation to the other bearings or conduits.

One of the prime objects of the invention is to design a lubricator provided with a pump, and provide simple, practical, and easy accessible means for adjusting the stroke thereof.

Another object is to design a lubricator having a plurality of discharge conduits, and provide a rotary valve structure for progressively connecting each conduit with the lubricant supply as the mechanism is actuated.

A further object is to design a simple, practical, and economical lubricating device which will simultaneously dispense two or more different kinds or grades of lubricant, which can be easily manufactured and assembled, which is provided with a pump and discharge conduits, and in which each pump stroke can be easily and quickly regulated so that the volume of lubricant pumped to each conduit in the complete cycle can be regulated as desired.

A still further object is to provide a lubricating device having a pump, and a rotary valve structure for progressively feeding lubricant to each discharge conduit, and further provide means for adjusting each stroke so that more or less lubricant can be fed to one conduit than to another throughout the entire cycle of the feeding.

With the above and other objects in view, the present invention consists in the combination and arrangement of parts, hereinafter more fully described, illustrated in the accompanying drawings, and particularly pointed out in the appended claims, it being understood that changes may be made in the form, size, proportion, and minor details of construction, without departing from the spirit, or sacrificing any of the advantages of the invention.

In the drawings—

Fig. 1 is a front view of our lubricating device.

Fig. 2 is a part sectional top plan view.

Fig. 3 is a transverse sectional view taken on the line 3—3 of Fig. 2.

Fig. 4 is an enlarged view showing the inner face of one of the pump actuating members.

Fig. 5 is a similar view of the opposite face.

Fig. 6 is a vertical sectional view taken on the line 6—6 of Fig. 5.

Fig. 7 is a fragmentary sectional assembly of the pump actuating member and pump plunger.

Fig. 8 is a fragmentary end view of the lubricator.

Referring now more particularly to the drawings, the numeral 5 indicates the main body of the receptacle, which is provided with a raised rib or section 6 formed on the one edge thereof; a lubricant tank or receptacle 7 is also formed integral, or it can be an individual unit and bolted in position if desired, a partition 8 dividing said tank into two individual receptacles "A" and "B" respectively. A longitudinally disposed cylindrical opening is provided in the main body, and a valve member 9 is revolubly mounted therein, the ends of the valve being turned as shown at 10, and end plates 11 are secured to the end walls of the main body by means of screws or the like to form a tight leakproof connection.

Adjustable pump actuating members 12 and 13 respectively are mounted on the turned ends of the valve and are formed as clearly shown in Figs. 4, 5, and 6 of the drawings, the inner face of each member being grooved as shown at 14, and a plurality of resilient segments 15 are secured in said groove, one end of each segment being secured to the groove in any approved manner, the opposite end being free and is adjustable in a manner to be presently described.

A flat disk member 16 is secured to the outer face of each actuated member, and screws 17 serve to secure it rigidly in position. A plurality of adjusting screws 18 are also mounted in the members 12 and 16 and project into the groove 14, the ends of the screws engaging the outer ends of the segments 15, so that they can be adjusted as desired.

Pump members 19 and 20 are mounted on the edge of the main body with their lower ends projecting into the lubricant receptacles "A" and "B", the upper end of each pump being open and is internally threaded to receive a plug 21, the offset section 22 being threaded to engage the threaded passage 23 provided in the main body, said passage communicating with a horizontally disposed passage 24 in which the plunger 25 is reciprocatingly mounted, a spring 26 being interposed between the inner end of the plunger and the end of the passage for forcing the plunger outwardly on the return stroke, a packing gland being provided as usual. A head 27 is provided on the outer end of the plunger and engages the segments 15 provided in the cam groove 14 so that the plunger will be reciprocated (as the mechanism is operated). A plug 28 is threaded in the inner end of the passage 23 and is provided with an orifice 29 which is controlled by the spring actuated check valve 30, said passage opening to the grooved passage 31 which communicates with the rotary valve 9 in which a plurality of spaced apart transversely disposed passages 32 are provided.

Similar passages 33 are provided in the block in spaced apart relation, and open to said valve, the outer end of each passage being threaded, and screw plugs 34 provide a closure therefor. Vertically disposed passages 35 communicate with the passages 33, and a feed nipple 36 is threaded in the upper end of each vertical passage, the block being countersunk as at 37 to receive the sight glass 38, the end of which is set in the gasket 39 in the usual manner.

The section 6 is cored as shown at 40 to accommodate the sight glasses 38, and the upper edge of the section is bored to accommodate the upper end of the sight glass which projects thereinto, a plug and gasket 42 and 43 respectively forming a closure and seal for the upper end of said sight glass, and a check valve 44 is also provided therein, conduits 45 leading from said plugs to the bearing or member to be lubricated. The sight glasses are, of course, filled with a suitable liquid in the conventional manner, but this however, forms no part of the present invention.

When it is necessary to provide different kinds of lubricant, two or more lubricant receptacles are used, a practical example being shown in the present instance, the pump 20 projecting into the receptacle "B" and is identical with the pump 19. It is also provided with a check valve 46, the passage 47 opening into the passage 48, which in turn communicates with the valve 9, the plunger 25 being identical as is also the pump actuating member, and it will be clearly obvious that two or more kinds of lubricant can be simultaneously pumped and dispensed through the same lubricator.

The members 12 and 13 are also identical excepting that the outer rim of the member 12 is provided with teeth 49. An operating lever 50 is mounted on the turned end of the valve and is held in position by means of a screw and washer 51 and 52 respectively, a dog or ratchet 53 being pivotally secured to the upper end of the lever, and the end of the ratchet engages the teeth 49 provided on the member 12, and as the lever 50 is oscillated, the valve 9 will be rotated to progressively bring the passages 32 in the valve into alignment with the passages 31 and 33 in the main body, and as the mechanism is driven, the heads of the plungers 25 engage and ride over the segments 15, imparting a reciprocating action to the plungers to pump the lubricant and force it through the passages into the sight glass and through the conduits to the bearing or part to be lubricated, and while in the present instance we have shown but eight outlet conduits, it will be obvious that any reasonable number may be provided by providing additional segments and passages.

The pump stroke is regulated by means of the adjusting screws 18, the mechanism being so timed that as the lubricant from each stroke is delivered to the valve 9, one of the openings 32 will register with one set of passages 31 and 33 so that the lubricant will be forced through the sight glass and into the conduit which communicates therewith, and if a larger volume of lubricant is desired, the adjusting screw is threaded inwardly to increase the length of the pump stroke, and vice versa for a shorter stroke and less lubricant.

From the foregoing description it will be understood that we have perfected a very simple, economical, and positive force lubricating device for use on automotive vehicles, machines, and in places where lubrication is necessary.

What we claim is:

1. The combination in a lubricator, of a pump, a rotary valve mounted in the lubricator and provided with spaced apart ports, discharge ducts communicating with said valve, each of said ports successively registering with a discharge duct as the valve is rotated, rotatable means for rotating said valve, and adjustable members mounted on said rotatable means for actuating said pump upon registration of each port with a discharge duct to force lubricant to the valve as the valve is driven.

2. The combination in a lubricator, of a pump, a rotary valve mounted in the lubricator and provided with spaced apart ports, a plurality of discharge ducts communicating with the valve and adapted to successively register with the ports as the valve is rotated, a driving member on said valve, and adjustable resilient means on said driving member for actuating said pump upon registration of each port with a discharge duct and for controlling the stroke of the pump as the valve is driven.

3. A lubricator comprising a main body having a rotary valve member journaled therein and provided with longitudinally spaced ports, a source of lubricant supply, a pump connected to said lubricant supply and including a spring retracted plunger member, passages leading from said pump to said valve, discharge ducts communicating with said valve, said passages being in communication with said ports when said ports register with the discharge ducts, rotatable means for rotating said valve, and means on said rotatable means for actuating said pump upon registration of each port with a discharge duct.

4. The combination in a lubricator, of a source of lubricant supply, a rotary valve journaled in the lubricator and provided with spaced apart ports therein, a pump for forcing lubricant to said valve, discharge ducts also communicating with said valve, each port successively registering with one of said discharge ducts when said port is in communication with the pump, means for driving said valve and means for varying each stroke of the pump in the cycle for forcing a predetermined volume of lubricant through each discharge duct.

5. The combination in a lubricator, of a source of lubricant supply, a pump mounted on the lubricator and connected to said source of lubricant supply, a rotary valve mounted in the lubricator and provided with individual spaced apart ports therein, passages leading from the pump to the valve, discharge ducts communicating with the valve, each port successively registering with said passages and one of said discharge ducts when the valve is in certain predetermined positions, means for rotating said valve, and spaced apart adjustable means on said rotatable means for actuating said pump upon registration of each port with a discharge duct to force lubricant through each port and into each discharge duct.

6. In a lubricator, the combination with a main body having a lubricant reservoir connected therewith, of a cylindrical rotary valve journaled in the body and having a plurality of spaced apart ports therein, a pump connected to the reservoir, passages establishing communication betwen said pump and valve, discharge ducts in the lubricator, each valve port registering with one of said discharge ducts when said port is in communication with the pump, means for driving said valve, and spaced apart adjustable members mounted on said driving means for actuating said pump each time a port registers with a discharge duct.

7. The combination in a lubricator, of a reservoir, a driven rotary valve structure mounted in the lubricator and provided with a plurality of spaced apart ports therein, a pump connected to the reservoir, passages establishing communication between the pump and the valve and registering with the ports in the valve as said valve is driven, a plurality of discharge ducts communicating with said valve, each port registering with one of the discharge ducts when said port is in communication with the pump, means for driving said valve, and adjustable members on said driving means for actuating said pump each time a port registers with a discharge duct.

8. The combination in a lubricator, of a source of lubricant supply, a pump connected to said source of supply, a cylindrical rotary valve mounted in the lubricator and provided with a plurality of longitudinally and circumferentially spaced ports therein, passages establishing communication between said pump and valve, said passages registering with certain predetermined ports as the valve is rotated, a plurality of discharge ducts communicating with said valve, each port registering with one of said discharge ducts when said port is in communication with the pump, means for driving said valve, and spaced apart pump actuating members mounted on said valve driving means for actuating the pump each time a port registers with a discharge duct.

9. A lubricator comprising a main body having a cylindrical valve member rotatably journaled therein, a pump including a plunger, passages establishing communication between said pump and valve, longitudinally and circumferentially spaced individual ports in said valve and registering with said passages as the valve is driven, discharge ducts in the main body and communicating with said valve, each valve port registering with one of said discharge ducts when said port is in communication wth the pump, means for driving said valve, and a plurality of adjustable members on said driving means for actuating said pump plunger each time a port registers with a discharge duct.

JOHN McCREADIE.
GUY HICKERSON.